United States Patent [19]
Conwell

[11] 3,913,331
[45] Oct. 21, 1975

[54] UNITARY AUXILIARY ELECTRIC POWER, STEAM SUPPLY AND HEATING PLANT FOR BUILDING CONSTRUCTION

[76] Inventor: Phillip J. Conwell, R.R. No. 1, Box 10, Mount Orab, Ohio 45154

[22] Filed: Dec. 11, 1974

[21] Appl. No.: 531,609

[52] U.S. Cl. .................................. 60/692; 60/670
[51] Int. Cl.² ........................................ F01K 9/00
[58] Field of Search ......................... 60/690–694, 60/670, 645

[56] References Cited
UNITED STATES PATENTS
1,313,676   8/1919   Du Pont ............................. 60/691

Primary Examiner—Allen Ostrager
Attorney, Agent, or Firm—Robert G. McMorrow

[57] ABSTRACT

A rectangular housing is provided with a plurality of vertically spaced, horizontal partitions defining separate sealed chambers in vertical ascending order for fuel storage, fuel and air combustion, steam boiler, combustion air preheating, steam condensation, turbine drive and electrical generation. Ducts connecting chambers effect forced and thermal syphonic movement of combustion air and combustion gases. Conduits fluid connect the turbine to the condenser and boiler heat exchange units. A powered fan introduces fresh air to the condenser chambers for condensing steam with the air being preheated prior to delivery to the combustion chamber.

5 Claims, 3 Drawing Figures

UNITARY AUXILIARY ELECTRIC POWER, STEAM SUPPLY AND HEATING PLANT FOR BUILDING CONSTRUCTION

BACKGROUND OF THE INVENTION

FIELD OF THE INVENTION

This invention relates to auxiliary electric power and heating plants and more particularly, to a packaged unit permitting the creation of electric power, and steam under pressure by the combustion of fuel stored within the unit and for utilizing the waste products of combustion to heat the building housing the same.

The present invention has application to small heating and power plants which are ideally suitable for use in rural hospitals, schools, apartment buildings and office buildings, or for other stationary or mobile power needs. There is a need for a small heating and power plant which is unitary in structure, which is incorporated within a generally imperforate housing and which may be readily transported from site to site on a general purpose truck.

Auxiliary heating and power equipment have been in the past provided for buildings and for mobile or stationary auxiliary power plants for emergency or primary use by incorporating within fixed installations or providing on mobile vehicles, such as a truck body, separate heating sources, steam generating equipment, and internal combustion engine powered electrical generator units, each of which has its own supply of fuel and its end use utilization or energy conversion means.

SUMMARY OF THE INVENTION

The present invention provides a unitary, composite housing which incorporates a steam turbine driven electrical generator, and an oil burner for generating the thermal energy to create the steam fed to the turbine, while permitting the utilization of the combustion products of the burner to heat the building within which the heating and power plant is employed. The unit is constituted by a rectangular housing including outer sidewalls and a top wall and a plurality of vertically spaced horizontal partitions which define with the outer walls, a series of vertically separated, generally sealed, thermally insulated compartments. The compartments house, in order, from the lowest compartment upward, a combustor, a steam boiler, a combustion air preheater, one or more steam condensers and a steam turbine driven generator unit. First duct means series connects the combustor outlet to the boiler and then to the air preheater with the products of combustion in the form of exhaust gas discharged either into the atmosphere, or delivered to the hot air heating system of the building with which the unit may be employed. Second duct means fluid connects in counterflow fashion to the first duct means, the condenser, the air preheater, and the combustor inlet. Water is forced by way of a pump from the water supply to the steam boiler and resulting steam is fed to the steam turbine and thence back through the condenser or condensers to the inlet side of the steam boiler to effect by turbine operation, the generation of electrical power. Two condensers may be effectively employed within separate condenser chambers divided by one of the horizontal partitions forming upper and lower condenser chamber sections. Fresh air entering the lower chamber under pressure by a powdered fan through an opening within the housing sidewall passes horizontally through the lower condenser chamber in heat exchange with the condenser coils therein, and passes vertically through an opening between the horizontal partition separating the upper and lower condenser chambers and passes in a reverse direction through the upper condenser chambers and thence through vertical duct means extending from the upper condenser chamber to the air preheater chamber underlying and separated from the lower condenser chamber by one of said horizontal partitions. Further, vertical duct means conduct the preheated combustion air to the combustion chamber for mixing with fuel and subsequent ignition within the combustor. Conduit means fluid coupled to one end of the condenser coil within the lower condenser chamber permits condensate to return to a hot well located within the bottom storage chamber and a pump in fluid communication with the hot well, pumps the liquid condensate into the heat exchange coil in the boiler chamber lying above the combustion chamber and below the preheater chamber. A vertical conduit leads from the opposite end of the heat exchange coil within the boiler chamber to deliver steam directly to the steam turbine positioned within the upper chamber above the upper condenser chamber. The outlet to the turbine is connected directly to the inlet side of the condenser coil located within the upper condenser chamber for condensing the steam.

An opening within the housing sidewall at the level of the lower condenser chamber prmits fresh air to enter the condenser chamber for subsequent delivery to the combustor. A powered fan forces air under pressure through the condenser chambers and the preheater chamber to the inlet side of the combustor for mixing with the fuel prior to combustion of the fuel air mixture. Air pressure controlled louvers within an opening of the sidewall at the upper condenser chamber controls the air pressure within the condenser chambers and thus the supply of air under pressure to the condenser chambers, the air preheater chamber and the combustor. A burner blower forces air under pressure into the inlet side of the combustor along with fuel from the fuel tank within the fuel storage chamber underlying the combustion chamber.

DESCRIPTION OF THE PREFERRED EMBODIMENT

Figure 1:
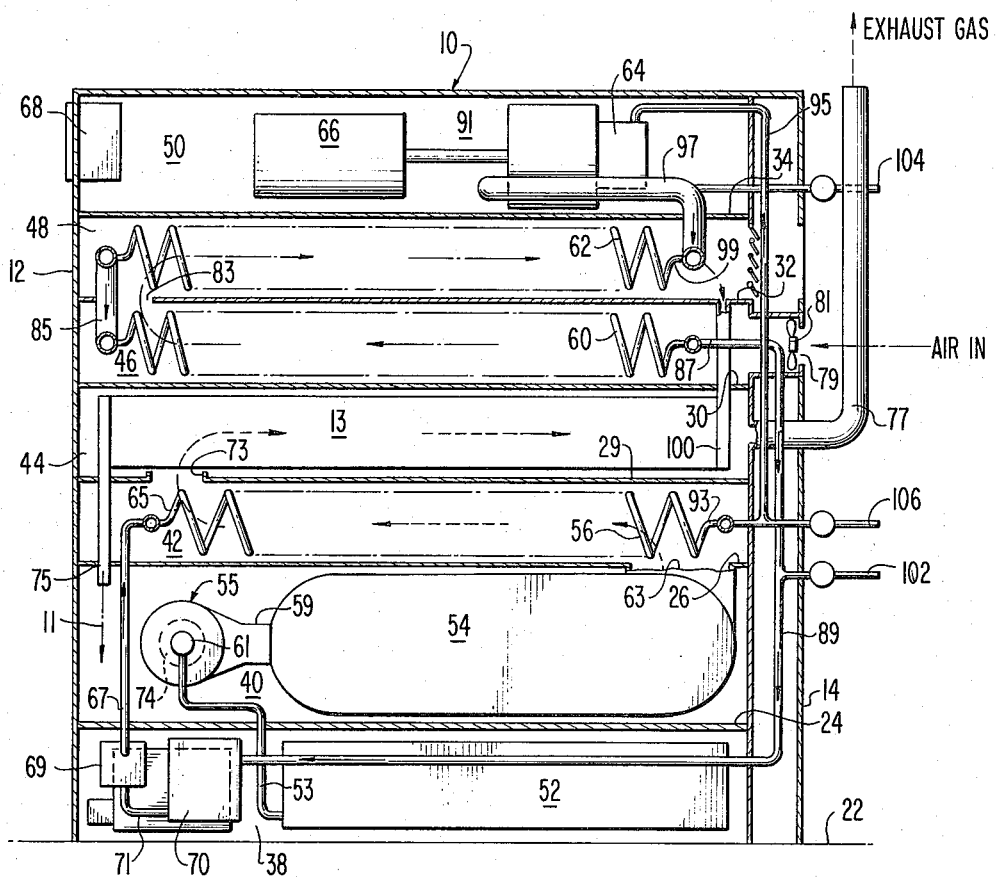
FIG. 1 is a side, sectional view of the unitary, auxiliary electric power steam and heating plant of the present invention.
Figure 2:
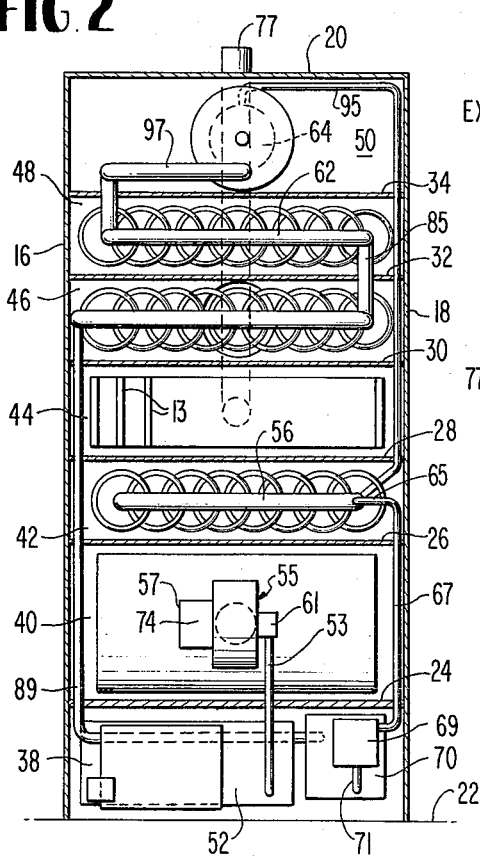
FIG. 2 is a left hand end view of the unitary plant of FIG. 1 with the end wall removed.

Referring to FIGS. 1 and 2, the unitary auxiliary electric power, steam supply and heating plant of the present invention which is preferably employed in the building construction as a package unit for auxiliary use in conjunction with buildings such as hospitals, schools, apartment buildings and the like. It consists essentially of a rectangular housing 10 including end walls 12 and 14, sidewalls 16 and 18, and a top or cover wall 20, the housing 10 being supported upon a platform or floor indicated generally at 22 and forming therewith an essentially closed container. The present invention advantageously employs a series of vertically spaced, horizontal partitions preferably formed of thermal insulation material as at 24, 26, 30, 32 and 34 for separating the rectangular housing into a series of thermal isolated chambers including a storage chamber 38, a combustor chamber 40, a boiler chamber 42, an air preheat chamber 44, a lower condenser chamber 46, an upper condenser chamber 48, and a power conversion chamber 50, respectively.

In this respect, the lower storage chamber 38 is provided with a fuel tank 52 which suplies fuel by way of line 53 to a fuel and air combustor 54 which is essentially cylindrical in form and is supplied with fuel and air by means of a blower assembly 55 including a burner blower 74 powered by an electric motor (not shown), an inlet opening 57 such that air within the combustor chamber 40 is forced under power through the restricted throat 59 and into the interior of combustor 54. Further, fuel through line 53 under control of fuel pump 61 driven by an electric motor or the like (not shown) supplies a metered amount of fuel to the combustor 54 in conventional oil fired burner fashion. Ignition is effected within combustor 54 by means (not shown). The burning of the fuel and air generates high temperature exhaust gas which is discharged from the combustor 54 through a first duct or opening 63 within partition 26 leading to the boiler chamber 42. Positioned within boiler chamber 42, is a zig zag conduit or boiler heat exchange coil 56 having an inlet end 65 connected by way of a boiler supply pipe 67 to condensate pump 69 which supplies liquid condensate by way of conduit 71 from the hot well 70 to the boiler heat exchange coil 56. A suitable opening 73 formed by a duct within the partition 28, which separates the boiler chamber 42 from the preheater chamber 44, permits the exhaust gas after a major portion of the heat has been picked up by the water within the heat exchange coil 56 of the boiler and turned to steam, to preheat the air passing through the preheater chamber 44 in the opposite direction. This preheated air passes through a vertical duct 75, arrow 11, which extends from the preheater chamber 44 directly to the combustor chamber 40 and opens up into the left side of that chamber, FIG. 1. Heat conductive metal panels 13 form baffles separating the gas from the air. Meanwhile, the products of combustion or exhaust gas, after preheating the air, discharge upwardly through exhaust gas flue 77 which leads directly from the preheater chamber 44 to a point above the cover or top wall 20 of the rectangular housing. This exhaust gas which is relatively hot may be used to heat the building within which the unit is placed under conventional hot air heating principles. In the alternative, the exhaust air may be lost to the atmosphere where there is no necessity to utilize the remaining thermal energy of this gas stream.

The fresh air for combustion purposes enters the unit through end wall 14 by way of opening 79, this opening leading directly into the lower condenser chamber 46. A motor driven fan 81 forces fresh air under pressure to enter the lower condenser chamber 46, this condenser chamber as well as the upper condenser chamber 48 carrying a heat exchange coil and forming a path for the fresh air to first flow over a lower condenser coil 60, separated from the preheater by partition 30 and through opening 83 within the partition 32 into the upper condenser chamber 48 for passage in the opposite direction that is from left to right over the upper condenser coil 62. A manifold 85 fluid connects the upper and lower condenser coils 60 and 62 within chambers 48 and 46 respectively. The discharge end 87 of the lower condenser chamber heating coil 60 is fluid connected by way of conduit 89 to hot well 70 whereby, the steam, after being condensed within the upper and lower condenser chambers 48 and 46, is returned to the hot well 70 prior to being forced by way of condensate pump 69 to the inlet side 65 of the boiler heat exchanger 56. Horizontal partition 34 closes off the upper condenser chamber 48 from the uppermost chamber 50 which constitutes the power generation chamber of the unit. In this respect, the power generation chamber 50 supports a steam turbine 64 which is mechanically coupled by way of shaft 91 to the electrical generator indicated schematically at 66 such that steam discharging from the right hand end 93 of the boiler heat exchange coil 56, after generation within chamber 42, is conducted by way of vertical conduit 95 to the steam turbine 64 while steam discharging from the turbine after driving the generator is directed by way of conduit 97 to the right hand or inlet side 99 of the upper condenser heat exchange coil 62. A control panel 68 mounts to the opposite end wall 12 of the unit to provide the control structure necessary to control operation of the electrical generator 66. A complete working fluid loop is formed including the boiler heat exchange coil 56, conduit 95, steam turbine 64, conduit 97, upper condenser heat exchange coil 62, manifold 85, lower condenser heat exchange coil 60, vertical conduit 89, hot well 70, conduit 71, condensate pump 69, and conduit 67 back to the inlet side 65 of the boiler heat exchange coil 56.

Further, fresh air entering opening 79 within the end wall 14 of the unit flows over the lower condenser heat exchange coil 60, through opening 83 within partition 32, over the upper condenser heat exchange coil 62 in a direction opposite to that in pasing over the lower heat exchange coil 60, through the vertical duct 100 extending from the horizontal partition 32 and chamber 48 into the preheater chamber 44, wherein this air passes in a direction opposite to the exhaust gas which enters the chamber through opening 73 and between heat exchange walls or panels 13 which separate the exhaust gas from the combustion intake air and permitting the combustion air after preheating by regenerative heat exchange within the preheater chamber 44 to move vertically downward through duct 75 which extends through horizontal partitions 26 and 28 for discharge into the left hand side of combustor chamber 40 adjacent the inlet opening 57 of the burner blower 55; whereby, this air is mixed with fuel from line 53 and ignited within the combustor 54. The products of combustion or exhaust gas is exhausted from the combustor 54, not only as a result of pressurization by means of the fresh air intake fan 81 and the burner blower 55, but further by thermal convection effect in which the heat naturally rises. The exhaust gas passes over the boiler heat exchange coil 56, through duct 73 opening and from left to right through the preheater and then through the exhaust gas duct 77 to exit at the top of the unit. If desired, process steam is made available from the package unit either at relatively high pressure and temperature by way of lower valved conduit 102 or at reduced temperature by way of upper valved conduit 104. Further, the conduit 106 which is fluid coupled to the vertical condensate return pipe 89, permits condensate to be removed from the pipe or added thereto at this point.

Figure 3:
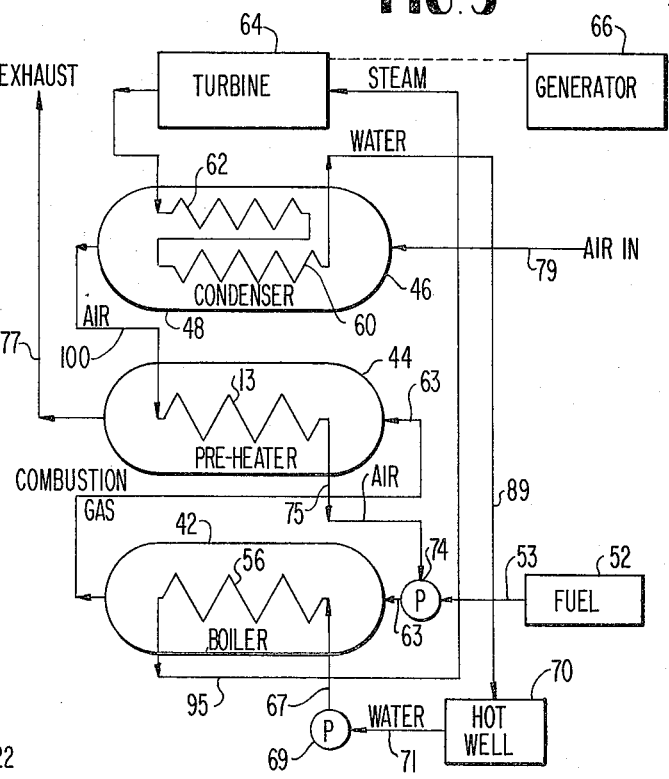
FIG. 3 is a pneumatic and hydraulic schematic representation of the unitary auxiliary electric power steam and heating plant illustrated in FIGS. 1 and 2.

The compact nature of the combined auxiliary power generating, steam and hot air heating plant, and the interrelation between components may be appreciated by further reference to FIG. 3 which illustrates in schematic form, the unit components corresponding exactly to the arrangement of FIGS. 1 and 2.

While the invention has been particularly shown and described with reference to a preferred embodiment therof, it will be understood by those skilled in the art that various changes in form and details may be made therein without departing from the spirit and scope of the invention.

Initial start-up of this unit is accomplished through a battery and starting motor (not shown) of any suitable type.

What is claimed is:

1. A compact unitary, transportable, auxiliary steam turbine driven electric generator power and heating plant comprising:
    a generally closed rectangular enclosure including opposed vertical end walls and opposed vertical sidewalls and a top wall spanning the upper ends of said sidewalls and endwalls,
    a plurality of vertically spaced, horizontal partitions within said enclosure forming at least first, second, third, fourth and fifth separate compartments in ascending order,
    at least some of said partitions being formed of heat insulative material,
    a fuel air mixture combustor carried within said first compartment,
    a boiler heat exchanger coil extending transversely within said second compartment,
    a plurality of horizontally spaced, vertical conductive walls within said third compartment,
    manifolds at either end of said conductive walls and forming therewith a combustion air preheater heat exchanger,
    a first condenser heater heat exchange coil extending transversely within said fourth chamber,
    a steam turbine driven electric generator within said fifth chamber,
    first conduit means fluid coupling said boiler heat exchange coil, said steam turbine and said first condenser coil and forming a closed loop path therebetween,
    first duct means within said partition separating said first and second chambers to effect flow of exhaust gas from the combustor over the boiler heat exchange coil and through said second chamber,
    second duct means within the partition separating the second and third chambers to direct exhaust gas after passage over the boiler heat exchange coil into the third chamber,
    an exhaust pipe fluid connected to said third chamber at the end of said chamber opposite that carrying said second duct means,
    an air inlet opening within an end wall of said enclosure at said fourth chamber introducing fresh air therein for passage over said condenser coil,
    third duct means extending through the partition separating said third and fourth chambers for directing heated fresh air into said third chamber for counterflow to and sealed from the exhaust gas for further preheating the combustor intake air, and
    fourth duct means within said third chamber at the end opposite that carrying said exhaust gas discharge pipe for receiving the preheated fresh air and conducting said preheated fresh air to said first chamber for intake by said combustor.

2. The unitary auxiliary power and heating plant as claimed in claim 1, wherein said plurality of partitions further includes a horizontal partition which defines a sixth chamber intermediate of the fourth and fifth chambers, said sixth chamber including a transversely extending second condenser coil, means fluid connecting the discharge end of the first condenser coil within the fourth chamber to the inlet end of the second condenser coil within the fifth chamber, fifth duct means fluid connected at one end to the sixth chamber and opening up at the other end to said third chamber for discharging the fresh air after passage over said first and second condenser coils into said third chamber for further preheating by said combustor exhaust gas, and air pressure controlled dampers mounted within one of said end walls opening up into said second condenser chamber for controlling the pressure of fresh air passing through said condenser chambers prior to delivery to said preheater chamber.

3. The unitary auxiliary power and heating plant as claimed in claim 2, wherein said plurality of horizontal partitions include a partition underlying said first chamber, spaced vertically therefrom and forming a seventh chamber, a fuel tank is carried within said seventh chamber, second conduit means passing through said partition separating said first chamber from said seventh chamber is coupled to said combustor for delivery of fuel from said fuel tank to said combustor, and said combustor includes a powered burner blower coupled to the inlet end thereof, said powered burner blower supporting a fuel pump fluid connected to said fuel tank by said conduit means such that operation of said burner blower and said fuel pump causes a fuel air mixture to enter the intake side of said combustor.

4. The unitary auxiliary power and heating plant as claimed in claim 3, wherein; a hot well is mounted within said seventh chamber, and wherein a conduit coupled to the discharge side of the first condenser coil is connected to the hot well to gravity deposit condensed water therein, and further conduit means leading from said hot well to the inlet side of said boiler heat exchange coil includes a pump therein for forcing condensate from said hot well into said boiler heat exchanger coil and for subsequent delivery as steam under pressure to said steam turbine.

5. A unitary, auxiliary, electric power generating and heating plant as claimed in claim 4, further comprising: valved conduits fluid coupled to said first conduit means on respective sides of said steam turbine providing access to provide steam at different pressure and temperatures.

* * * * *